(12) United States Patent
Straw

(10) Patent No.: US 8,800,934 B1
(45) Date of Patent: Aug. 12, 2014

(54) SPACE ACCESS SYSTEM WITH REUSABLE BOOSTER

(71) Applicant: The Boeing Company, Seal Beach, CA (US)

(72) Inventor: Anthony D. Straw, Aliso Viejo, CA (US)

(73) Assignee: The Boeing Company, Chicago, IL (US)

( * ) Notice: Subject to any disclaimer, the term of this patent is extended or adjusted under 35 U.S.C. 154(b) by 228 days.

(21) Appl. No.: 13/659,697

(22) Filed: Oct. 24, 2012

Related U.S. Application Data

(60) Provisional application No. 61/692,668, filed on Aug. 23, 2012.

(51) Int. Cl.
*B64G 1/10* (2006.01)
*B64G 1/14* (2006.01)

(52) U.S. Cl.
USPC ..................................... 244/159.3; 244/158.4

(58) Field of Classification Search
USPC .......... 244/158.9, 158.1, 158.5, 159.3, 158.4, 244/171.1, 171.3
See application file for complete search history.

(56) References Cited

U.S. PATENT DOCUMENTS

| | | | | |
|---|---|---|---|---|
| 3,955,784 | A * | 5/1976 | Salkeld | 244/171.1 |
| 4,477,042 | A | 10/1984 | Griswold, II | |
| 4,771,599 | A * | 9/1988 | Brown et al. | 60/258 |
| 4,771,600 | A * | 9/1988 | Limerick et al. | 60/258 |
| 4,884,770 | A * | 12/1989 | Martin | 244/159.3 |
| 6,158,693 | A * | 12/2000 | Mueller et al. | 244/158.9 |
| 6,193,187 | B1 | 2/2001 | Scott | |
| 6,557,803 | B2 | 5/2003 | Carpenter et al. | |
| 6,568,639 | B2 | 5/2003 | Carpenter et al. | |
| 6,619,031 | B1 * | 9/2003 | Balepin | 60/246 |
| 6,666,409 | B2 | 12/2003 | Carpenter et al. | |
| 6,789,767 | B2 * | 9/2004 | Mueller et al. | 244/173.3 |
| 6,932,302 | B2 * | 8/2005 | Martin | 455/12.1 |
| 8,534,598 | B2 * | 9/2013 | Salkeld | 244/63 |
| 2002/0179776 | A1 * | 12/2002 | Mueller et al. | 244/158 R |
| 2004/0000613 | A1 | 1/2004 | Thomas, Jr. | |
| 2005/0045772 | A1 * | 3/2005 | Martin | 244/158 R |
| 2006/0249626 | A1 | 11/2006 | Simpson et al. | |
| 2009/0140101 | A1 * | 6/2009 | Salkeld | 244/159.3 |
| 2011/0272528 | A1 * | 11/2011 | Maiboroda | 244/158.5 |

* cited by examiner

*Primary Examiner* — Philip J Bonzell

(57) ABSTRACT

A space access system may include a reusable booster limited to sub-orbital operation and having a fuselage. The reusable booster may include a tri-propellant propulsion system which may be configured to shift from a tri-propellant mode of operation to a bi-propellant mode of operation. The tri-propellant propulsion system may include at least one tri-propellant engine and at least one internal propellant tank mounted within the fuselage and being fluidly coupled to the tri-propellant engine. A payload may be mounted with the fuselage. The payload may have an upper stage.

21 Claims, 9 Drawing Sheets

SPACE ACCESS SYSTEM WITH REUSABLE BOOSTER

The present application claims priority to U.S. Provisional Application No. 61/692,668 filed on Aug. 23, 2012, and entitled SPACE ACCESS SYSTEM WITH REUSABLE BOOSTER, the entire contents of which is expressly incorporated herein by reference.

FIELD

The present disclosure relates generally to launch vehicles and, more particularly, to a reusable booster configured as an orbital delivery space access system.

BACKGROUND

The cost of launching a payload such as a satellite into Earth orbit is relatively high. A large portion of the total cost of launching a payload into space includes life cycle system costs and operational costs. Life cycle system costs may include the total costs incurred over the life of the launch vehicle program. Operational costs may include the costs associated with the preparation of the launch vehicle, positioning the launch vehicle on the launch pad, fueling and pressurizing the launch vehicle, and performing system testing and system check-out prior to launch.

Current launch vehicles require multiple-expendable stages to deliver a payload to orbit. During each flight, expendable components or stages are discarded as the launch vehicle flies to orbit. Staging is defined as the dropping off of mass (e.g., a first stage, a second stage, solid rocket boosters) from the launch vehicle during flight. Staging is required due to current propulsion system limitations and to reduce the launch vehicle system weight. Staging also reduces engine throttling requirements such that the launch vehicle and the payload do not exceed axial acceleration limits. In addition, staging increases the amount of payload mass that may be delivered to orbit. However, staging increases the cost of an orbital deliver system because the staged hardware must be built or refurbished for each mission.

In addition to the above-mentioned drawbacks associated with staging, conventional launch systems also require an operator's license, extensive mission planning, customer payload custom interfaces, and significant manpower for assembly, launch, and range operations. Typical mission planning and mission assurance for conventional launch systems can take up to two years. Furthermore, conventional launch systems require component transportation (e.g., transportation of a booster stage, a second stage, an upper stage, etc.) to the launch site. Conventional launch systems also require assembly of the components at the launch site which adds to the overall cost of a launch.

As can be seen, there exists a need in the art for a system and method for reducing the total cost of launching a payload into space.

SUMMARY

The above noted needs associated with conventional launch systems are specifically addressed by the present disclosure which, in an embodiment, provides a space access system that includes a reusable booster and may include a one or more expendable or reusable upper stage(s). The reusable booster may have a fuselage and may include a tri-propellant propulsion system which may be configured to shift from a tri-propellant mode of operation to a bi-propellant mode of operation. The tri-propellant propulsion system may include at least one tri-propellant engine and at least one internal propellant tank mounted within the fuselage and being fluidly coupled to the tri-propellant engine. A payload may be mounted externally on the fuselage or internally in the fuselage. The payload may have an upper stage.

In a further embodiment, disclosed is a space access system including a sub-orbital reusable booster. The reusable booster may include a tri-propellant propulsion system which may be configured to shift from a tri-propellant mode of operation to a bi-propellant mode of operation. The tri-propellant propulsion system may include at least one tri-propellant engine and at least one internal propellant tank mounted within the fuselage and being fluidly coupled to the tri-propellant engine.

Also disclosed is a method of operating the space access system. The method may include providing a reusable booster having a fuselage and a tri-propellant propulsion system including at least one tri-propellant engine and at least one internal propellant tank fluidly coupled to the tri-propellant engine. The method may include mounting a payload externally on the fuselage or internally in the fuselage, and launching the vehicle in a vertical orientation from a launch site of a planetary body. The method may also include shifting the tri-propellant engine between a tri-propellant mode of operation and a bi-propellant mode of operation during launch of the space access system, and limiting the reusable booster to sub-orbital operation while encircling the planetary body. The method may further include deploying the payload from the space access system, and landing the reusable booster in a horizontal orientation at a location adjacent to the launch site. The reusable booster may also be landed in a vertical orientation at a location adjacent to the launch site.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numerals refer to like parts throughout and wherein.

DETAILED DESCRIPTION

Figure 1:
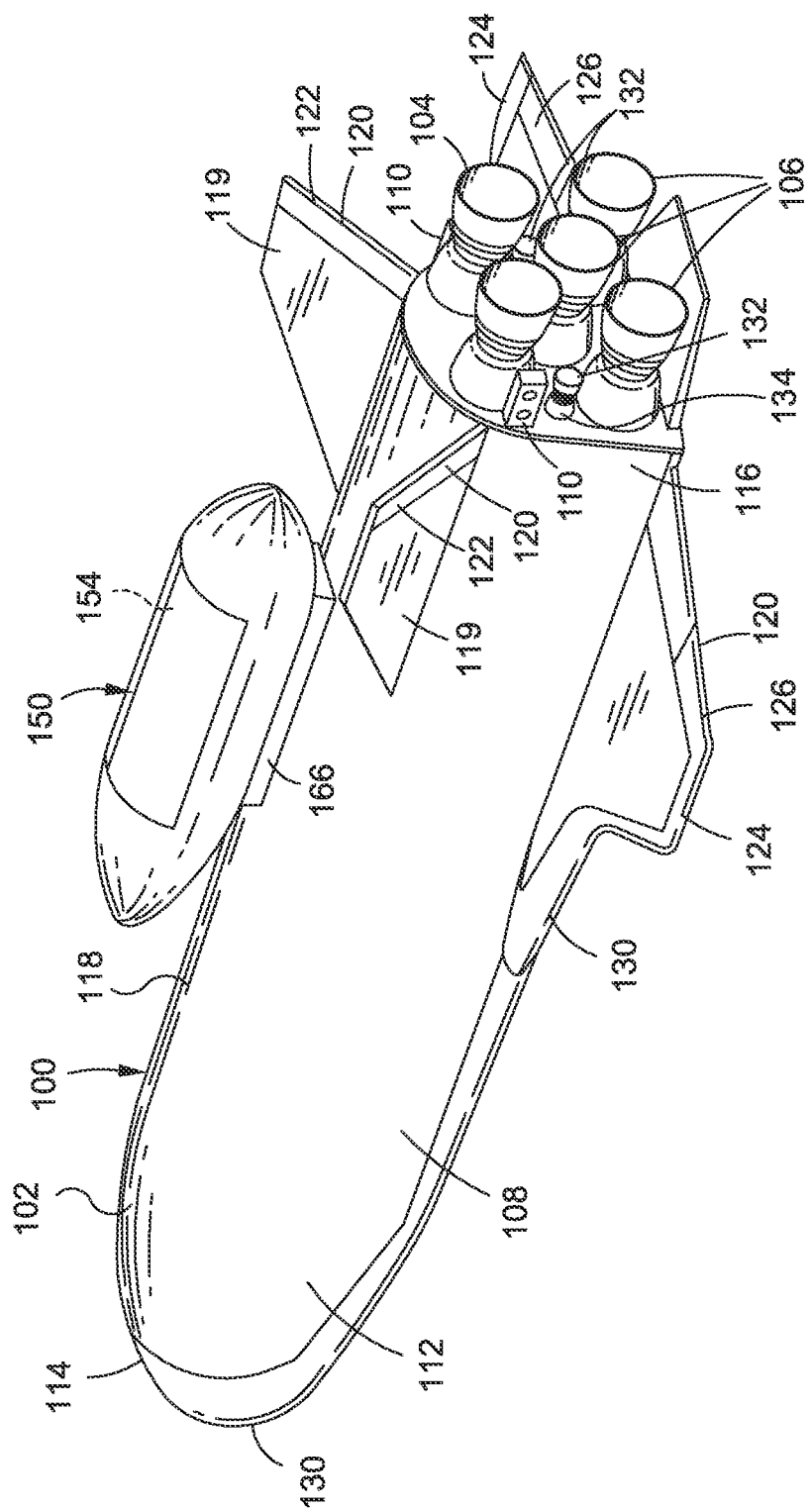
FIG. 1 is perspective view of an embodiment of a space access system reusable booster having an external cargo pod mounted on top of the reusable booster.

Referring to the drawings wherein the showings are for purposes of illustrating preferred and various embodiments of the disclosure, shown in FIG. 1 is a space access system 100 including a reusable booster 102 configured to carry an external payload 154 that may be mounted on a fuselage 112 of the reusable booster 102. The reusable booster 102 may be defined as a once-around space access system 100 wherein the reusable booster 102 has a tri-propellant propulsion system 104 with tri-propellant engines 106 providing sufficient energy launch vertically from a launch site 180 (FIG. 8) of a planetary body 182 (FIG. 8), deploy the payload 154, encircle the planetary body 182, and land in a horizontal or vertical orientation back at the launch site.

Advantageously, the reusable booster 102 may be limited to sub-orbital operation to minimize propulsion requirements. Furthermore, the tri-propellant propulsion system 104 may be configured to shift from a tri-propellant mode of operation to a bi-propellant mode of operation. In this regard, the tri-propellant propulsion system 104 may provide an effective pseudo-staging for the reusable booster 102 when shifting from the tri-propellant mode of operation to the bi-propellant mode of operation which results in an effective throttling to reduce the thrust of the tri-propellant engines 106 and increase the specific impulse.

In FIG. 1, the reusable booster 102 may include the fuselage 112 having a nose 114 and an aft end 116. The reusable booster 102 may include a pair of wings 124 extending outwardly from the fuselage 112. The reusable booster 102 may further include one or more stabilizing surfaces 119 such as the outwardly-canted stabilizing surfaces 119 mounted on the aft end 116 of the fuselage 112. The stabilizing surfaces 119 may also include a conventional vertical stabilizer (i.e., a single vertical fin—not shown) for directional stability. The reusable booster 102 may also include one or more control surfaces 120 for control of the roll, pitch, and/or yaw of the reusable booster 102. For example, the reusable booster 102 may include one or more ailerons or elevons 126 mounted on the trailing edge of the wings 124 for roll and pitch control. Control surfaces 120 such as ruddervators 122 or the functional equivalent may be mounted on the stabilizing surfaces 119 for pitch and/or yaw control of the reusable booster 102. Although not shown, stabilizing surfaces 119 and/or control surfaces 120 may be mounted on the wing 124 tips. A thermal protection system 130 may be applied to the reusable booster 102 to minimize heat load on the vehicle substructure.

In FIG. 1, the tri-propellant propulsion system 104 may include at least one tri-propellant engine 106 and one or more internal propellant tanks 108 mounted within the fuselage 112 and being fluidly coupled to the tri-propellant engines 106. For example, liquid oxygen and/or hydrogen, and/or kerosene may be stored in the fuselage 112. Propellant such as kerosene or other propellant may also be stored in the wings 124 of the reusable booster 102. In an embodiment, the tri-propellant propulsion system 104 may include five (5) tri-propellant engines 106 although any number of engines may be provided. In an embodiment, the tri-propellant engines 106 may have an engine sea-level thrust-to-weight ratio of between approximately 60 and 130 and preferably an engine thrust-to-weight ratio of between approximately 80-110.

The tri-propellant propulsion system 104 may employ a combination of two types of fuels and one type of oxidizer. For example, the types of fuel may comprise liquid hydrogen and kerosene for the tri-propellant propulsion system 104. The oxidizer may comprise liquid oxygen. The combination of tri-propellant propulsion system 104 and once-around orbit capability enables an upper stage 160 of the payload 154 to be smaller than for conventional launch vehicles. In addition, the reusable booster 102 may have a relatively high useful propellant mass fraction as compared to a single stage-to-orbit space delivery system due to the ability to omit on-orbit systems such as a crew compartment, a life support system, an orbital maneuvering system for docking, on-orbit propellant, solar radiators and fuel cells for generating power, and a variety of other on-orbit systems typically required by conventional reusable launch vehicles including manned launch vehicles. For example, the reusable booster 102 may have a useful propellant mass fraction of between approximately 0.89 to 0.94 although the reusable booster 102 may have a useful propellant mass fraction that is outside of the 0.89 to 0.94 range. Advantageously, the ability to omit the above-mentioned systems from the reusable booster 102 disclosed herein results in a reduced operational risk, reduced booster mass, and reduced cost for the space access system 100.

Figure 2:
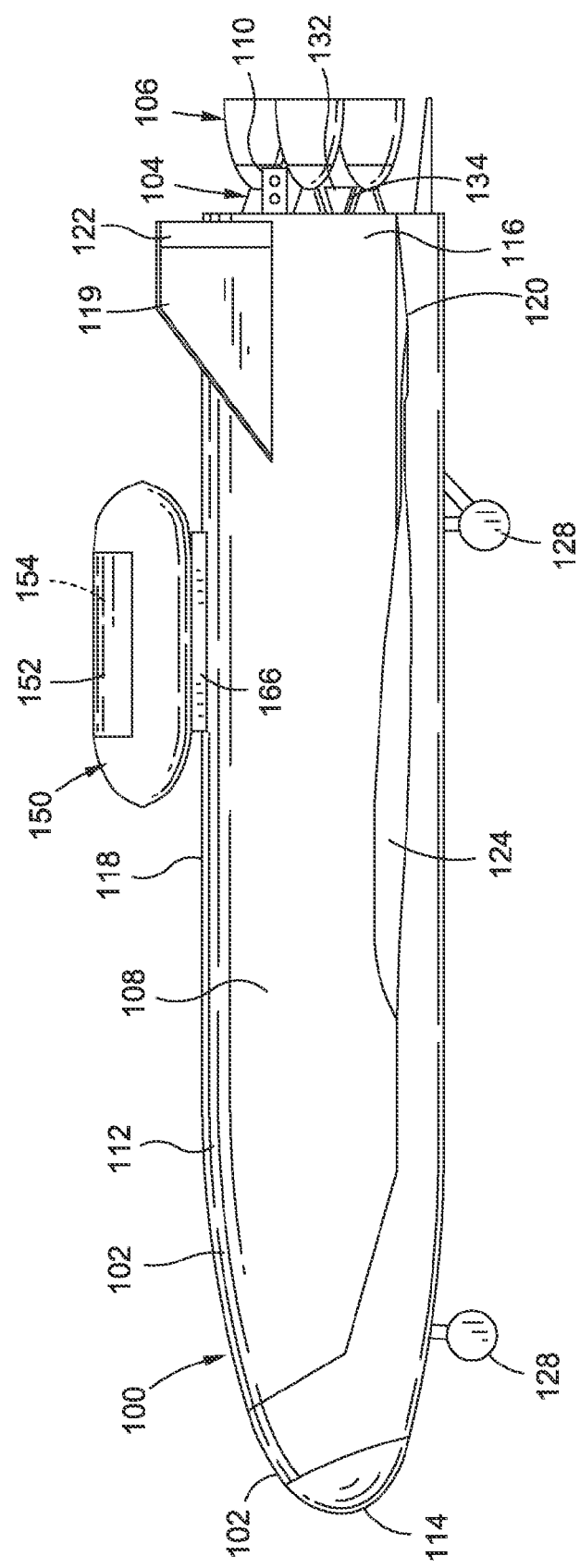
FIG. 2 is a side view of an embodiment of the reusable booster of FIG. 1 and having an external cargo pod mounted on top of the reusable booster.

Referring to FIG. 2, shown is a side view of the reusable booster 102 having the payload 154 mounted externally on a top 118 of the fuselage 112 on an external payload mounting system 166. In this regard, an embodiment of the reusable booster 102 may include an external cargo pod 150 mounted on top 118 of the fuselage 112 and configured to house and deploy a payload 154 such as a satellite 156 or other payload 154. The external cargo pod 150 may also be configured to capture or retrieve a payload 154. Although not shown, the external cargo pod 150 may include an integral payload structure or cradle for carrying static loads and dynamic loads of the payload 154. The external cargo pod 150 may comprise a protective aerodynamic fairing for protecting the payload 154 from the elements. Advantageously, by mounting the payload 154 external to the reusable booster, the cargo pod may be sized, shaped, and configured to accommodate different payload configurations in contrast to conventional launch systems wherein the size of the payload container is dictated by the launch vehicle fairing.

Figure 8:
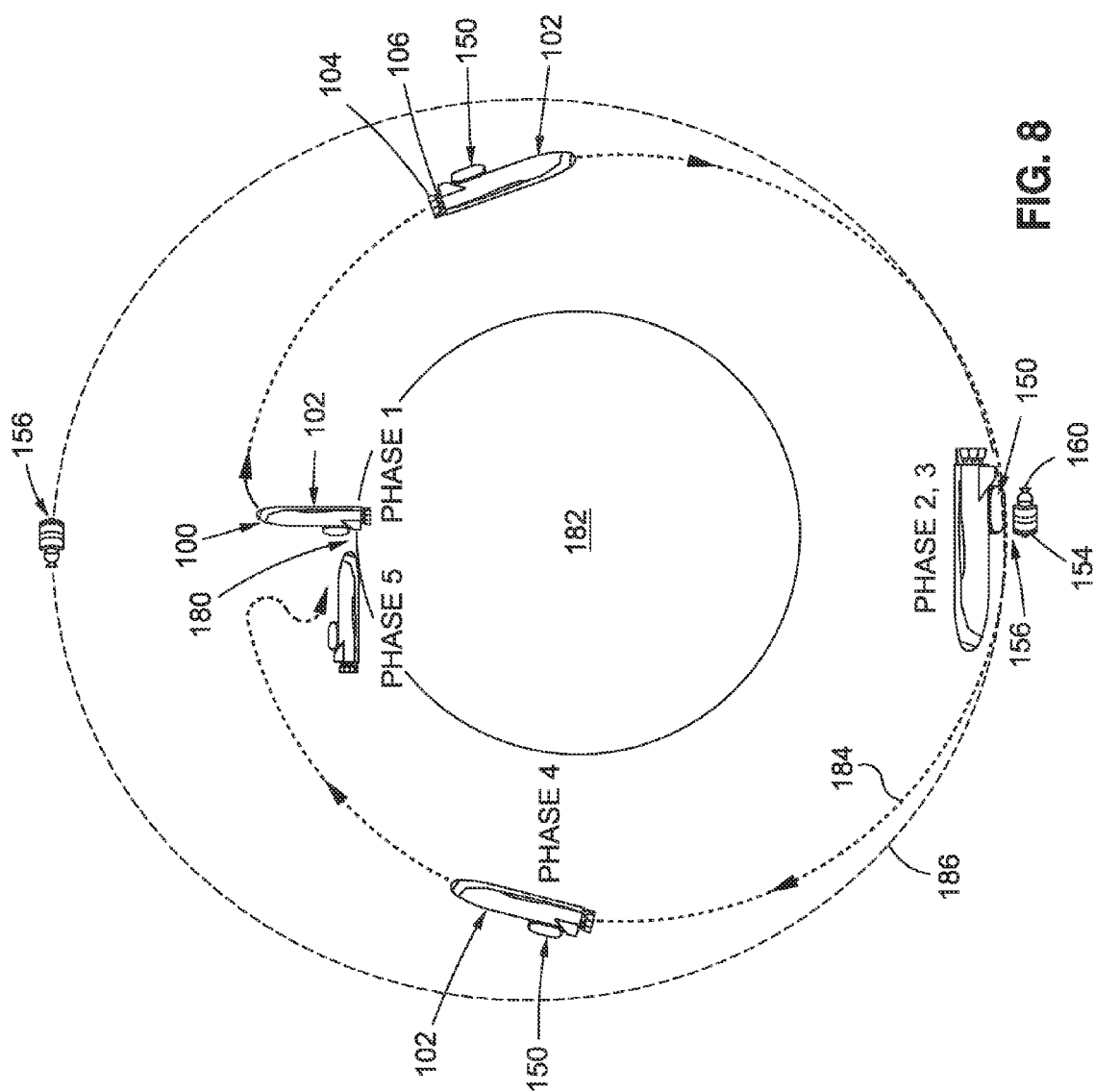
FIG. 8 is a schematic illustration of an embodiment of the phases during a mission of the space access system.

In FIG. 2, the reusable booster 102 may further include a landing gear 128 to facilitate horizontal landing and recovery of the reusable booster 102 at the launch site 180 after the reusable booster 102 completes the once-around orbit of the planetary body 182 (FIG. 8). The landing gear 128 may be provided in a tricycle configuration comprising a conventional nose gear at the nose 114 of the reusable booster 102 and a pair of main landing gear 128 toward the aft end 116 of the reusable booster 102. However, the landing gear 128 may be provided in any one of a variety of alternative configurations and is not limited to a tricycle configuration.

The reusable booster 102 may include a thermal protection system 130 for minimizing heat load on the reusable booster 102 structure during re-entry and descent from the launch orbit into the Earth's atmosphere. In this regard, the thermal protection system 130 may be configured to maintain the temperature of the metallic or composite substructure of the reusable booster 102 below the temperature at which the mechanical properties of such substructure begin to degrade. In an embodiment, the thermal protection system 130 may comprise a plurality of insulative tiles or other insulation configurations and which may be formulated of different material compositions depending upon the heat environment at different locations on the reusable booster 102.

A majority of the internal volume of the fuselage 112 may be occupied by the propellant tanks 108 which contain consumable propellants for the tri-propellant engines 106. Although not shown, the propellant tanks 108 may be integrally formed with the fuselage 112 or the propellant tanks 108 may be separate structures that may be mounted within the fuselage 112. During the once-around mission of the reusable booster, a substantial portion of the propellant may be consumed such that the integral or non-integral propellant tanks 108 may be substantially empty at engine burnout. Advantageously, upon re-entry of the reusable booster 102 into the Earth's atmosphere, the reusable booster 102 may have a significantly reduced areal or surface density relative to the re-entry associated with conventional reusable launch vehicles. The reduced areal density of the reusable booster 102 may reduce the thermal load on the reusable booster 102 relative to conventional reusable launch vehicles. The reduced thermal load allows for a simplified thermal protection system 130 which advantageously reduces operating costs, thermal protection mass, and minimizes the time required for maintenance of the thermal protection system 130 between missions.

Figure 3:
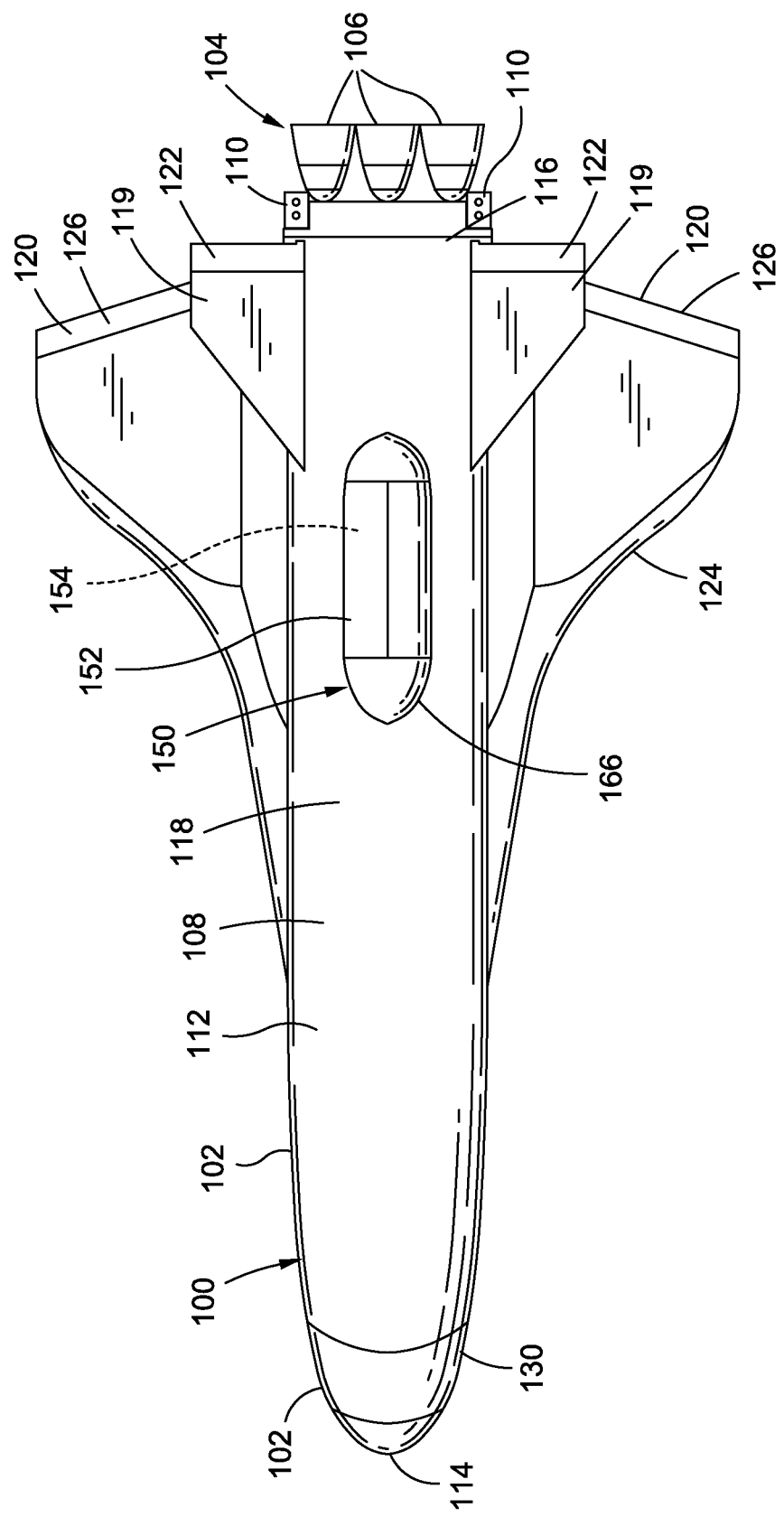
FIG. 3 is a top view of the embodiment of the reusable booster of FIG. 2.

Referring to FIG. 3, the reusable booster 102 may advantageously be provided in an aerodynamic configuration with a relatively low ballistic coefficient that may further minimize heat loading. In an embodiment, the reusable booster 102 may have a ballistic coefficient of between approximately 70-105 pounds per square foot, e.g., 80 lb/ft$^2$. Advantageously, such a relatively low ballistic coefficient may allow the reusable booster 102 to decelerate at a relatively fast rate and may also reduce the heat load imposed on the reusable booster 102 such as during re-entry.

In FIG. 2, the reusable booster 102 may optionally include a reaction control system 110 for controlling the attitude of the reusable booster 102 during a once-around mission. In an embodiment, the reaction control system 110 may comprise one or more reaction control system 110 thrusters mounted at various locations such as at the aft end of the fuselage 112. Such reaction control system 110 thrusters may be oriented in various directions to provide control of the orientation and/or attitude of the reusable booster 102. In an embodiment, the reaction control system 110 may comprise a fuel (e.g., kerosene) and an oxidizer (e.g., gaseous oxygen) system for providing small amounts of thrust to allow for adjustment of the roll, pitch, and yaw orientation of the reusable booster 102. For example, the reaction control system 110 may be activated in order to orient the external cargo pod 150 away from the planetary body 182 (FIG. 8) prior to deployment of the payload 154 from the reusable booster 102.

In FIG. 2, the reusable booster 102 may additionally include a range extension system 132. In an embodiment, the range extension system 132 may comprise one or more range extension engines 134 mounted at various locations at the aft end 116 of the fuselage 112. The range extension system 132 may also comprise using one or more of the main tri-propellant engines 104. Such range extension system 132 may be activated to raise the reusable booster 102 perigee to extend the range of the reusable booster 102 for landing at the launch site 180 (FIG. 8). For example, the range extension system 132 may comprise restarting one or more of the main tri-propellant engines 104 for adjustment of the orbit perigee of the reusable booster 102. The range extension system 132 may include activating one or more of the range extension engines 134 to adjust the orbit perigee of the reusable booster 102. In an embodiment, the range extension system 132 may comprise a fuel (e.g., kerosene) and an oxidizer (e.g., liquid oxygen) system for delivery to the range extension engines 134 for providing small amounts of thrust to allow for adjustment of the orbit perigee of the reusable booster 102.

Figure 4:
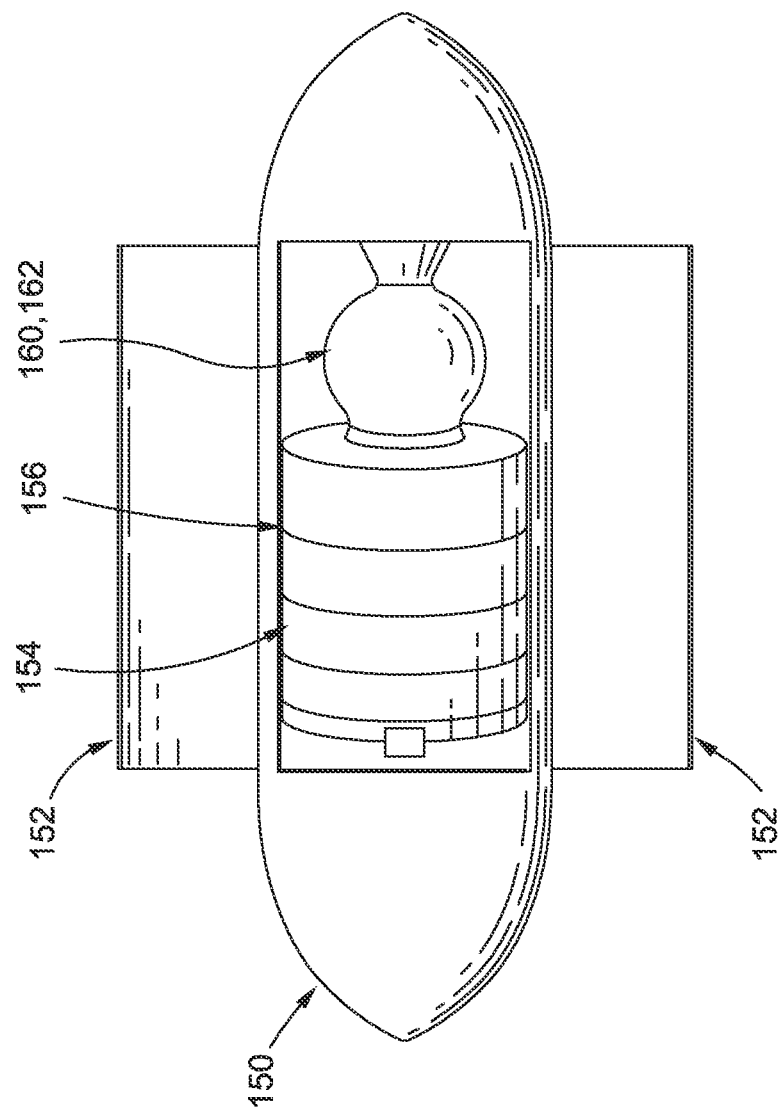
FIG. 4 is a top view of an embodiment of the external cargo pod and a satellite as a representative payload contained within the external cargo pod.

Referring to FIG. 4, shown is a top view of an embodiment of the external cargo pod 150 with the cargo pod doors 152 open to expose the payload 154. As mentioned above, the external cargo pod 150 may include an integral payload 154 structure for carrying the loads of the payload 154 during launch, ascent, and potentially during re-entry, descent and landing if the payload is carried back to the launch site. In addition, the payload 154 structure may be configured to deploy and/or retrieve a payload 154. Although a single payload 154 is illustrated as a satellite 156 mounted within the external cargo pod 150, the external cargo pod 150 may be configured to house and deploy any number of individual payloads 154 in any configuration and is not limited to a single payload 154 configured as a satellite 156.

Figure 6:
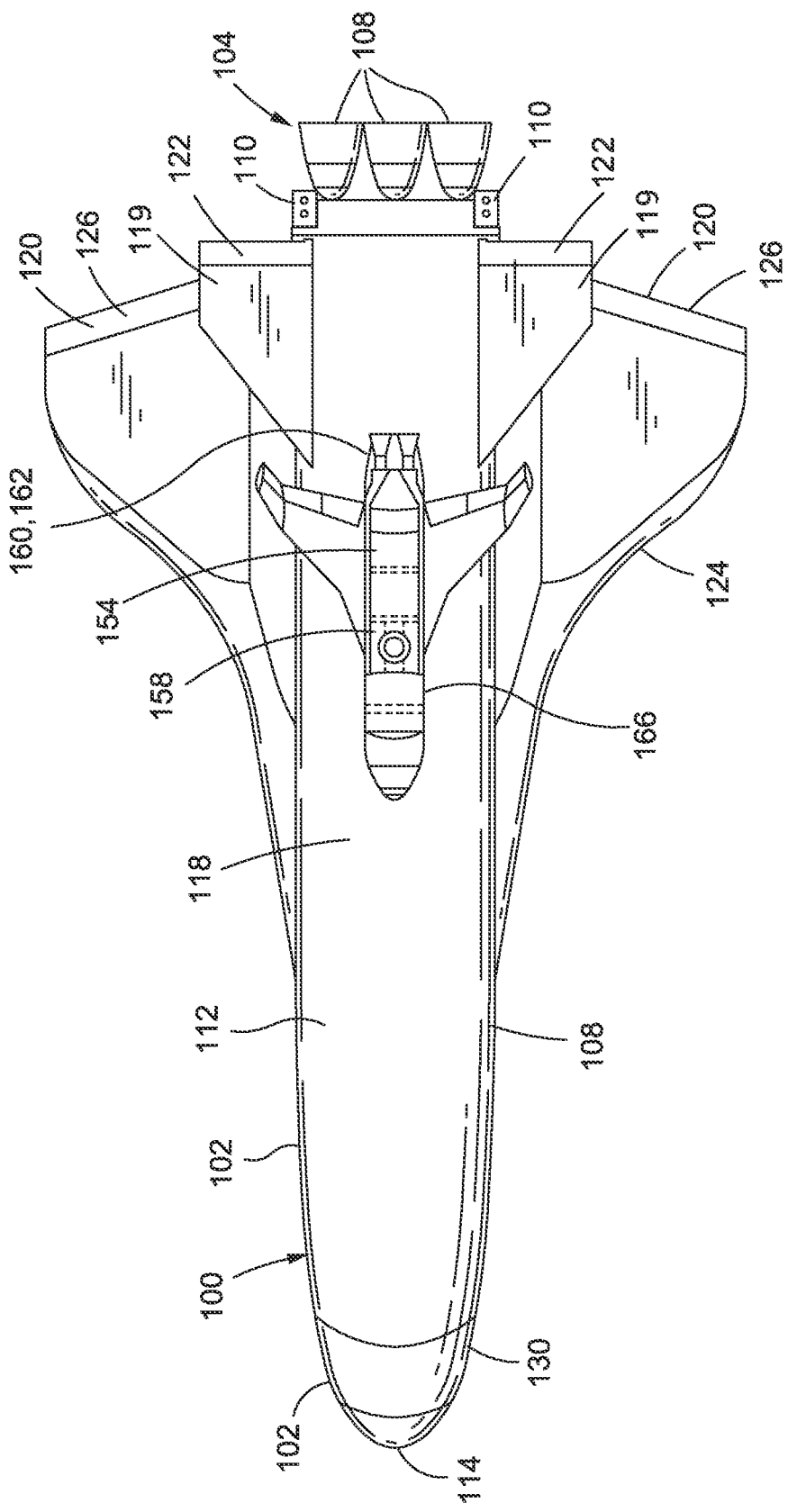
FIG. 6 is a top view of the embodiment of the reusable booster of FIG. 2 having a crew return vehicle mounted on top thereof.
Figure 7:
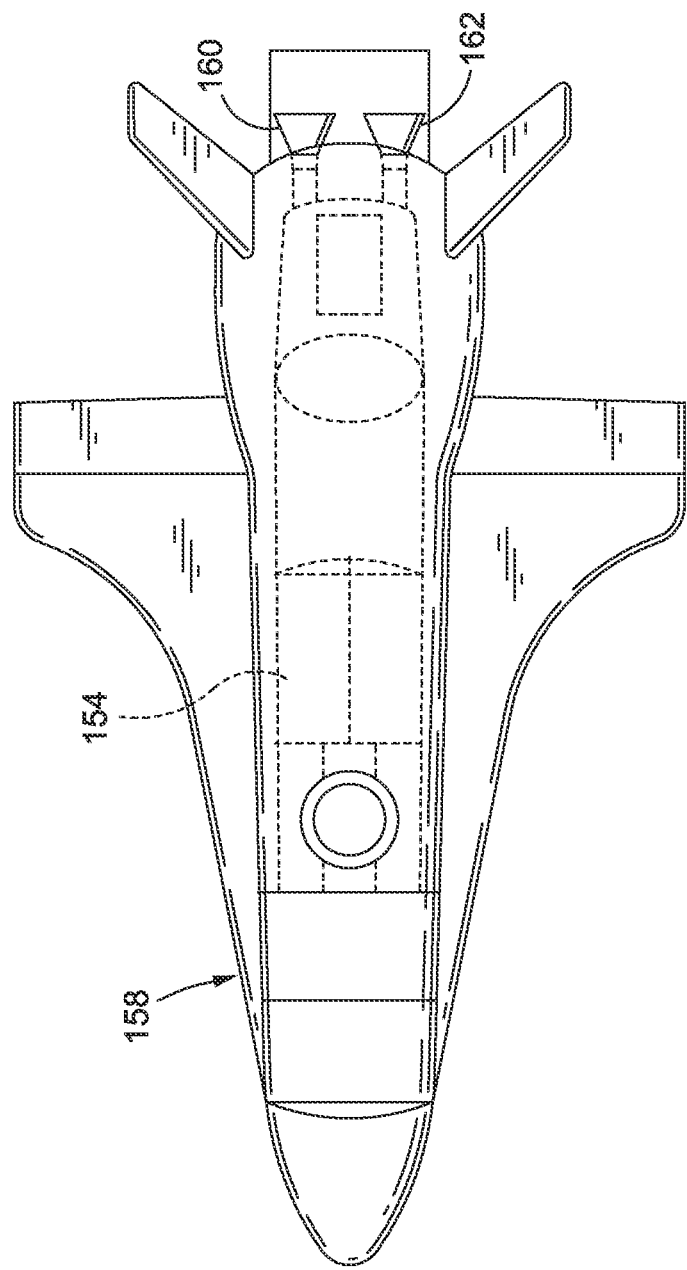
FIG. 7 is a top view of an embodiment of a crew return vehicle.

In an embodiment, the payload 154 may include one or more upper stages 160 such as for inserting the payload 154 into a payload orbit 186 (FIG. 8) after deployment from the reusable booster 102. For example, the upper stage 160 may comprise a single stage configuration 162 as shown in FIG. 4. Alternatively, the upper stage 160 may comprise a crew return vehicle plus cargo stage configuration (FIGS. 6-7). The upper stage 160 may be configured as a liquid-fueled rocket engine or propulsion system to allow for engine throttling. However, the upper stage 160 may be provided in any configuration and is not limited to a liquid-fueled propulsion system.

Figure 5:
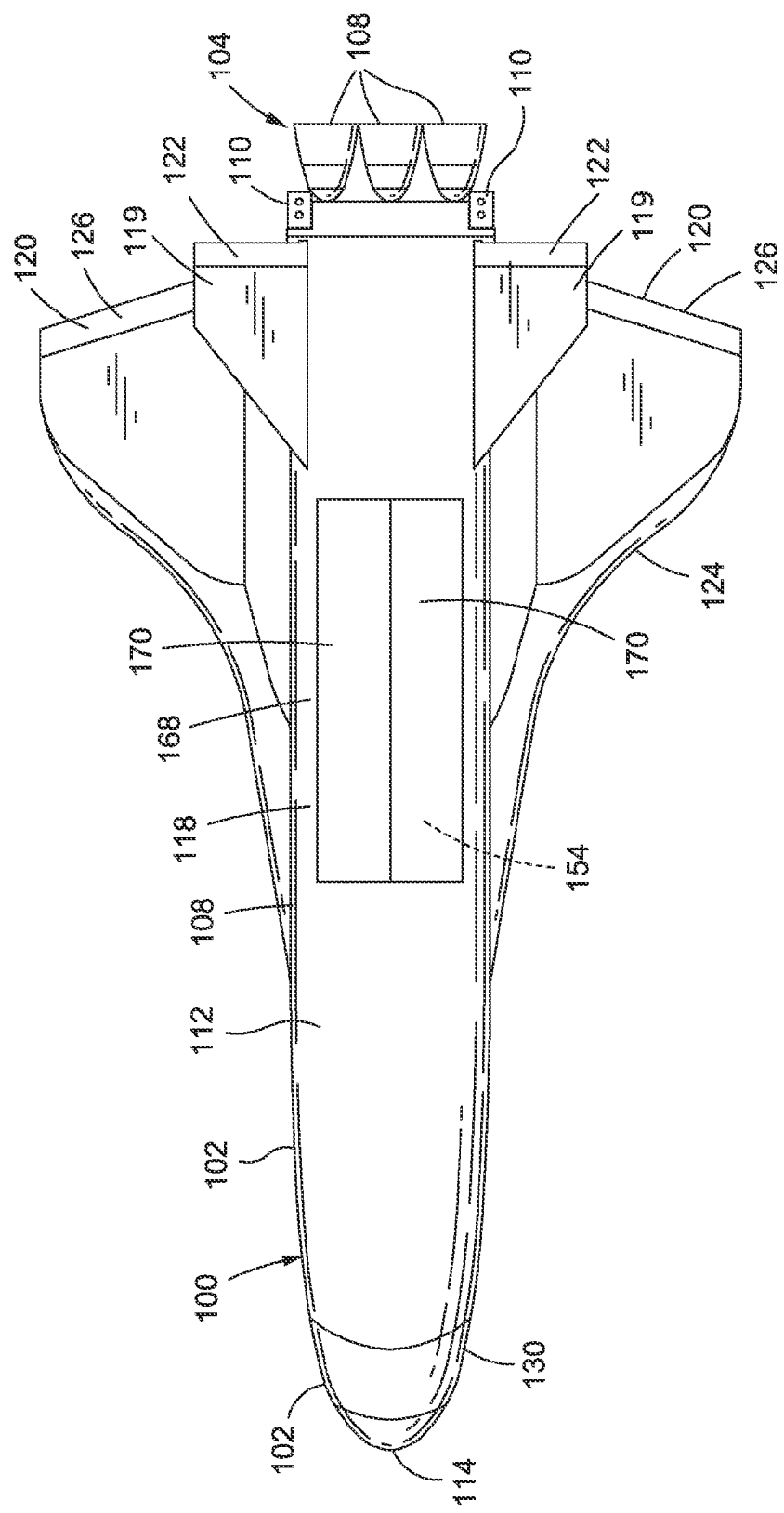
FIG. 5 is a top view of an embodiment of the reusable booster having an internal cargo bay.

Referring to FIG. 5, shown is a top view of the reusable booster 102 wherein the reusable booster having an internal cargo bay 168. The internal cargo bay may be sized and configured to house and deploy a payload such as a satellite 156 as shown in FIG. 4 or other payload 154 configurations. The internal cargo bay 168 may also be configured to capture or retrieve a payload 154. Although not shown, the internal cargo bay 168 may include an integral payload support structure or cradle for supporting the payload 154 and which may be configured to deploy and retrieve a payload 154 through one or more cargo bay doors 170 that may be included in the fuselage 112.

Referring to FIG. 6, shown is a top view of the reusable booster 102 wherein the externally mounted payload 154 comprises a crew return vehicle 158 mounted on top 118 of the fuselage 112. In this regard, the reusable booster 102 may advantageously include an external payload mounting system 166 configured to interchangeably mount any one of a variety of different payload configurations. For example, the external payload mounting system 166 may be configured to interchangeably mount an external cargo pod 150 (FIGS. 2-4), a crew return vehicle 158 (FIGS. 1 and 5-6), or any one of a variety of other payload configurations.

In FIG. 7, shown is an embodiment of a crew return vehicle 158 as may be mounted on the reusable booster 102. The crew return vehicle 158 may include an upper stage 160 in a one-stage configuration or the crew return vehicle 158 may include a two-stage configuration upper stage 160 as required to provide the necessary delta-V (i.e., change in velocity) to allow the crew return vehicle 158 to achieve a desired orbit. The crew return vehicle 158 may be configured to serve any number of different functions including, but not limited to, evacuation of crew members from a manned space platform such as a space station in the event of an emergency or for other purposes. The reusable booster 102 may be configured to releasably secure the crew return vehicle 158 to the fuselage 112 via the external payload mounting system 166. Advantageously, by mounting payloads 154 externally on the fuselage 112, a wide range of different cargoes but may be carried by the reusable booster 102.

Referring to FIG. 8, shown is a schematic diagram of the phases during a once-around mission as may be performed by the reusable booster 102 disclosed herein. Phase 1 represents vertical launch of the reusable booster 102 from a launch site 180 on a planetary body 182 such as Earth. The reusable booster 102 may be launched into an elliptical vehicle orbit 184 such as an orbit of approximately 100 nautical miles (nmi) by 30 nm i although the reusable booster 102 may be launched into any sub-orbital trajectory.

Phase 2 represents separation of the payload 154 from the reusable booster 102. In an embodiment, the payload 154 may be deployed from the reusable booster 102 when the reusable booster 102 is at an apogee of the vehicle orbit 184. For example, the payload 154 may be deployed or released from the reusable booster 102 when the reusable booster 102 attains an altitude of approximately 400,000 feet. However, the payload 154 may be deployed at any altitude greater than 400,000 feet, without limitation.

Phase 3 represents activation firing of the upper stage 160 propulsion system of the payload 154. For example, the payload 154 may comprise a satellite 156 having a one-stage configuration upper stage 160. The upper stage 160 may provide the necessary delta-V for achieving the desired orbital velocity for inserting the satellite 156 into the desired payload orbit 186. Advantageously, by separating the satellite 156 from the reusable booster 102 at a sub-orbital location instead of carrying the entire reusable booster 102 to the desired payload orbit, efficiency is greatly improved relative to conventional reusable launch vehicles.

Phase 4 represents the reusable booster 102 continuing to encircle the planetary body 182 back toward the launch site 180. The reusable booster 102 may be configured to execute any necessary re-entry maneuvers and may return back toward the launch site 180 with the external cargo pod 150 attached to the reusable booster 102. Advantageously, the reusable booster 102 may be configured to return to Earth with the payload 154 contained within the external cargo pod 150 and/or with a payload 154 such as a crew return vehicle 158 mounted to the fuselage 112.

Phase 5 presents the descent and landing phase of the reusable booster 102 for recovery in a horizontal orientation. However, the reusable booster 102 may also be configured for recovery in a vertical orientation (not shown). As indicated above, the reusable booster 102 may include landing gear 128 which may be extended prior to touchdown at a location that is preferably adjacent to the launch site 180. By landing at a location adjacent to the launch site 180, the time and cost required for refurbishing the reusable booster 102 and/or an un-deployed payload 154 may be minimized.

Figure 9:
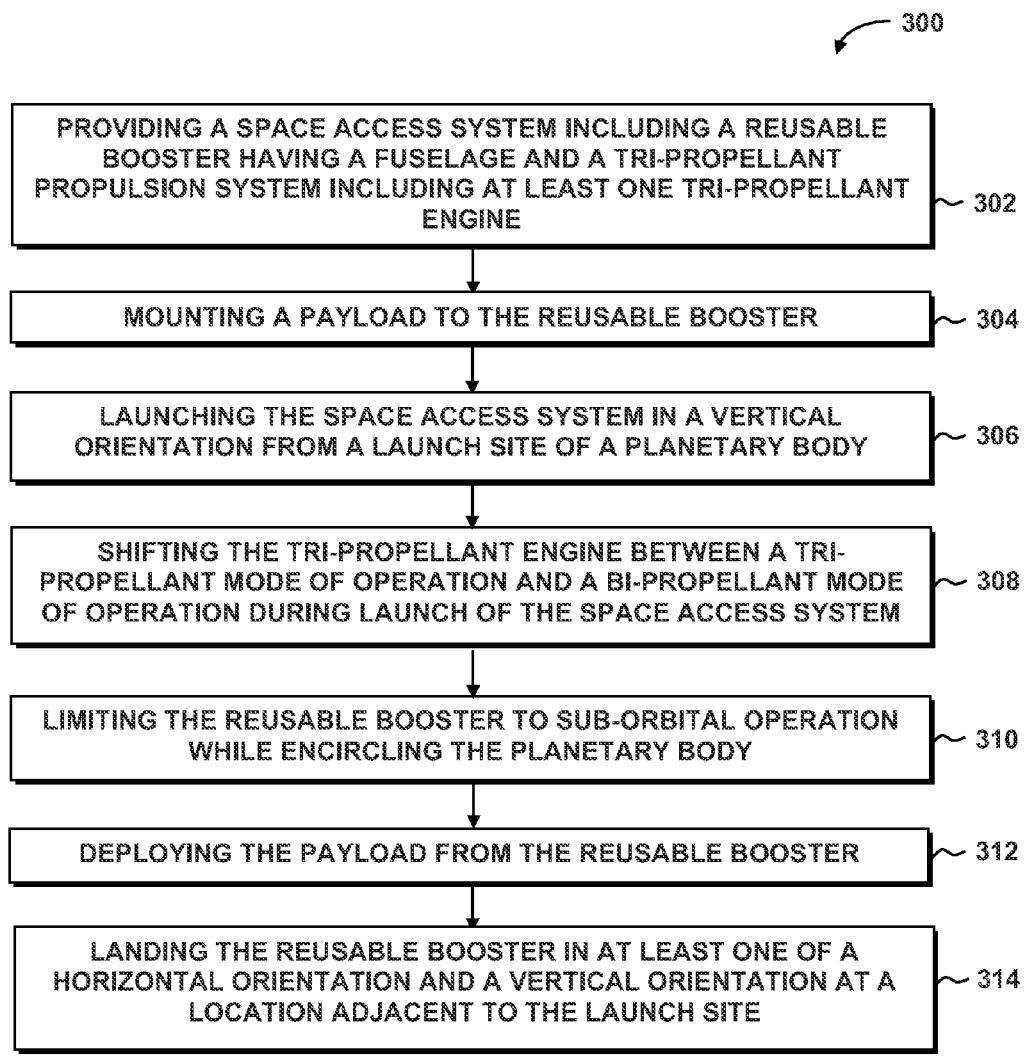
FIG. 9 is a flow chart illustrating one or more operations that may be included in a method of operating the space access system.

Referring to FIG. 9, shown is a flow chart illustrating an embodiment of a method 300 of operating a space access system 100 including a reusable booster 102. Step 302 of the method 300 may include providing the reusable booster 102 as described above having a fuselage 112, wings 124, controls surfaces 120, and a tri-propellant propulsion system 104. The tri-propellant propulsion system 104 including tri-propellant engine 106 and internal propellant tanks 108 may be mounted within the fuselage 112 and may be fluidly coupled to the tri-propellant engines 106. The internal mounting of the internal propellant tanks 108 may simplify the internal layout of the fuselage 112 and reusable booster 102. In addition, internal mounting of the propellant tanks 108 may reduce or eliminate the risk of damage to the reusable booster 102 (e.g., thermal protection system 130) such as may occur from falling debris (e.g., from an externally mounted tank—not shown). Furthermore, carrying propellant within the fuselage 112 may mitigate vehicle directional control problems that may otherwise occur due to travel of the reusable booster center of gravity as propellant is consumed.

Step 304 of the method 300 of FIG. 9 may include mounting a payload 154 externally on the fuselage 112 such as on top 118 the fuselage 112. As indicated above, the payload 154 may be separately developed and processed and may be externally mounted on the external payload mounting system 166. Advantageously, the external payload mounting system 166 may facilitate interchangeable mounting different types of payloads 154. The external cargo pod 150 and external payload mounting system 166 may reduce system complexity for integrating various payloads 154. In this regard, payload canisters (not shown) may be integrated and processed while detached from the reusable booster 102. After processing, the payload 154 may be attached to the reusable booster 102 at a point in time that is nearer the launch time than is feasible with conventional reusable launch vehicles that require processing the payload with internal cargo bays of such conventional launch vehicles. In an embodiment, the reusable booster 102 may include an internal cargo bay 168 (FIG. 5) for mounting a payload 154 within the fuselage 112 as mentioned above. The payload 154 may be at least partially processed and loaded into the internal cargo bay 168 through the cargo bay doors 170 (FIG. 5).

Step 306 the method 300 of FIG. 9 may include launching the reusable booster 102 in a vertical orientation from a launch site 180 of a planetary body 182 (FIG. 8). Advantageously, the reusable booster 102 may be launched using existing launch complexes. The launch operations may incorporate automated mission planning and depot maintenance at the launch site 180 to reduce the manpower requirements for launch and service of the reusable booster 102.

Step 308 of the method 300 of FIG. 9 may include shifting the tri-propellant engines 106 between a tri-propellant mode of operation and a bi-propellant mode of operation during ascent of the reusable booster 102. In an embodiment, the tri-propellant propulsion system 104 may propel the reusable booster 102 up to a relatively high staging velocity such as up to approximately Mach 25 or higher and which may minimize the relatively large throw-away mass of upper stages associated with conventional reusable launch vehicles. Shifting from a tri-propellant mode of operation to a bi-propellant mode of operation may provide effective pseudo-staging of the tri-propulsion engines which may reduce engine thrust and increase engine specific impulse.

Advantageously, a tri-propellant propulsion system 104 may also allow for a reduced size of the reusable booster 102 as a result of the packaging efficiency (e.g., reduced propulsion system mass) of a tri-propellant solution relative to a conventional bi-propellant system comprising liquid hydrogen/liquid oxygen bi-propellant engines. Furthermore, tri-propellant engines 106 may have a higher early-flight thrust-to-weight ratio than liquid hydrogen/liquid oxygen bi-propellant engines which may result in a reduction of engine mass and total reusable mass of the reusable booster 102 and which may additionally result in moving the reusable booster 102 center-of-gravity forward for improved controllability relative to a reusable launch vehicle having bi-propellant engines.

Step 310 of the method 300 of FIG. 9 may include limiting the reusable booster 102 to sub-orbital operation during the once-around mission encircling the planetary body 182 (FIG. 8). For example, the reusable booster 102 may be configured to achieve an elliptical orbit of approximately 100 nmi×30 nm i as indicated above or other vehicle orbits such as a polar orbit. By remaining sub-orbital, propulsion system requirements may be minimized relative to conventional reusable launch systems that carry the payload all the way to payload orbit. In addition, by remaining sub-orbital, the need for on-orbit systems such as solar radiator panels, on-orbit propellant, or orbital maneuvering system for docking may be eliminated.

Step 312 of the method 300 of FIG. 9 may include deploying the payload 154 from the reusable booster 102 as shown in FIG. 8. In an embodiment, for a payload 154 contained within an external cargo pod 150, deployment of the payload 154 may comprise opening at least one door of the cargo pod door(s) 152 of the external cargo pod 150, deploying the payload 154 from the external cargo pod 150, and closing the cargo pod door(s) 152. As indicated above, the payload 154 may be provided in any one of a variety of different configurations that may be deployed from the reusable booster 102. For example, the method may include deploying a crew return vehicle 158 from the reusable booster 102 or deploying a satellite 156 from an external cargo pod 150.

The method may further include deploying the payload 154 when the reusable booster 102 is at a desired altitude and/or when the reusable booster 102 is at an apogee of the vehicle orbit 184. The method may further include inserting the payload 154 into the payload orbit 186 such as by using an upper stage 160 coupled to the payload 154, as described above. For example, the method may include regulating the upper stage 160 in a manner providing the delta-V necessary to insert the payload 154 into the desired payload orbit 186.

Step 314 of the method 300 of FIG. 9 may include continuing the reusable booster 102 along the once-around vehicle orbit 184 after payload deployment and then executing re-entry maneuvers for re-entry of the reusable booster 102. The method may further include a descent stage followed by extending the landing gear 128 and landing the reusable booster 102 in a horizontal orientation. Preferably, the reusable booster 102 may land at a location adjacent to the launch site 180 to eliminate the need for transporting the reusable booster 102 to the launch site 180 for processing for another launch. Advantageously, the space access system 100 disclosed herein may include landing the reusable booster 102 with the payload 154 mounted to the fuselage 112 as may be desired following a deployment anomaly or for other reasons.

The ability to land the reusable booster 102 with the payload 154 attached provides the ability to perform a final payload status check during ascent just prior to payload 154 deployment to determine if the payload 154 is ready for release. Errors occurring in the final payload status check of the payload 154 during the payload status check may provide an indication that the payload 154 can be safely returned to Earth for checkout and refurbishment which may advantageously save the cost of payload 154 that may otherwise be lost with a conventional expendable launch system. In an embodiment, the reusable booster 102 may also be used as a point-to-point delivery system between different launch complexes.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A space access system, comprising:
    a single-stage reusable booster having a fuselage and being configured to maintain sub-orbital operation and limited to performing a single orbit of a planetary body and no more, the reusable booster including wings for landing in a horizontal orientation back at a launch site after launching from the launch site;
    a tri-propellant propulsion system included with the reusable booster and configured to shift from a tri-propellant mode of operation to a bi-propellant mode of operation, the tri-propellant propulsion system including:
        at least one tri-propellant engine; and
        at least one internal propellant tank mounted within the fuselage and being fluidly coupled to the tri-propellant engine; and
    no more than one payload having an upper stage for inserting the payload into a payload orbit, the payload being mounted at least externally on the fuselage or internally within the fuselage.

2. The space access system of claim 1 wherein:
    the payload is housed within an internal cargo bay within the fuselage.

3. The space access system of claim 1 wherein:
    the payload is housed within an external cargo pod mounted on top of the fuselage.

4. The space access system of claim 1 wherein:
    the payload comprises a crew return vehicle mounted on top of the fuselage.

5. The space access system of claim 1 wherein:
    the reusable booster has a useful propellant mass fraction of between approximately 0.89 to 0.94.

6. The space access system of claim 1 further comprising:
    a reaction control system included with the reusable booster and configured for controlling an attitude thereof.

7. The space access system of claim 1 further comprising a range extension system including at least one of the following:
    one or more range extension engines; and
    restarting one or more tri-propellant engines.

8. The space access system of claim 1 wherein:
    the tri-propellant propulsion comprises two types of fuel and one type of oxidizer.

9. The space access system of claim 8 wherein:
    the types of fuel comprise liquid hydrogen and kerosene.

10. The space access system of claim 8 wherein:
    the type of oxidizer comprises liquid oxygen.

11. The space access system of claim 1 further comprising:
    an external payload mounting system configured to interchangeably mount one of an external cargo pod and a crew return vehicle to the fuselage.

12. The space access system of claim 11 wherein:
    the external cargo pod is configured to deploy and retrieve a payload.

13. The space access system of claim 11 wherein the upper stage has one of:
    a single stage configuration; and
    a crew return vehicle plus cargo stage configuration.

14. A space access system for deployment of a payload into space, comprising:
    a sub-orbital single-stage reusable booster having wings and a tri-propellant propulsion system and being configured to maintain sub-orbital operation and limited to performing a single orbit and no more of a planetary body, the reusable booster including wings for landing in a horizontal orientation back at a launch site after launching from the launch site; and no more than one payload mounted externally on the reusable booster, the payload having an upper stage for inserting the payload into a payload orbit.

15. A method of operating a space access system, comprising the steps of:

providing a reusable booster having a fuselage and a tri-propellant propulsion system including at least one tri-propellant engine and at least one internal propellant tank fluidly coupled to the tri-propellant engine, the reusable booster being limited to performing a single orbit of a planetary body and no more, and including wings for landing in a horizontal orientation back at a launch site;

mounting a payload to the reusable booster;

launching the reusable booster in a vertical orientation from a launch site of a planetary body;

shifting the tri-propellant engine between a tri-propellant mode of operation and a bi-propellant mode of operation during launch of the reusable booster;

encircling the planetary body a single time and no more during a once-around orbit of the planetary body;

limiting the reusable booster to sub-orbital operation while encircling the planetary body during the once-around orbit of the planetary body;

deploying the payload from the reusable booster; and landing the reusable booster in a horizontal orientation at a location adjacent to the launch site after payload deployment during the once-around orbit of the planetary body.

16. The method of claim 15 wherein the step of shifting the tri-propellant engine between a tri-propellant mode of operation and a bi-propellant mode of operation includes:

reducing engine thrust and increasing engine specific impulse as a result of shifting from the tri-propellant mode of operation to the bi-propellant mode of operation.

17. The method of claim 15 wherein the step of deploying the payload comprises:

opening at least one door of at least one of an external cargo pod and an internal cargo bay;

deploying the payload; and closing the door.

18. The method of claim 15 further comprising the step of:

deploying the payload approximately at an apogee of a vehicle orbit of the vehicle.

19. The method of claim 15 wherein the step of deploying the payload comprises:

inserting the payload into a payload orbit using an upper stage coupled to the payload.

20. The method of claim 15 wherein the step of deploying the payload comprises:

deploying a crew return vehicle from the reusable booster.

21. The method of claim 15 wherein the step of landing the reusable booster includes:

landing the reusable booster with the payload attached thereto.

* * * * *